(12) United States Patent
Mizuta

(10) Patent No.: US 10,552,106 B2
(45) Date of Patent: Feb. 4, 2020

(54) VIEWING CONTROL SERVER AND VIEWING CONTROL METHOD

(71) Applicant: SEIKO EPSON CORPORATION, Tokyo (JP)

(72) Inventor: Masahiko Mizuta, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/104,012

(22) Filed: Aug. 16, 2018

(65) Prior Publication Data

US 2019/0056898 A1 Feb. 21, 2019

(30) Foreign Application Priority Data

Aug. 18, 2017 (JP) ................................. 2017-157821

(51) Int. Cl.
*G06F 3/12* (2006.01)
*H04L 29/08* (2006.01)

(52) U.S. Cl.
CPC .......... *G06F 3/1238* (2013.01); *G06F 3/1204* (2013.01); *G06F 3/1288* (2013.01); *H04L 67/12* (2013.01)

(58) Field of Classification Search
USPC .............. 358/1.1–3.29, 1.11–1.18, 504, 406; 399/8–126
See application file for complete search history.

(56) References Cited

U.S. PATENT DOCUMENTS

| 2004/0111315 | A1* | 6/2004 | Sharma | G06Q 10/0875 709/223 |
| 2010/0235290 | A1* | 9/2010 | Junger | G06Q 10/0833 705/304 |
| 2011/0188068 | A1* | 8/2011 | Jones | G06Q 30/018 358/1.15 |
| 2015/0229520 | A1* | 8/2015 | Ichikawa | H04L 12/6418 709/222 |

(Continued)

FOREIGN PATENT DOCUMENTS

| JP | 2007-280248 A | 10/2007 |
| JP | 2017-162092 A | 9/2017 |

*Primary Examiner* — Marcellus J Augustin
(74) *Attorney, Agent, or Firm* — Workmam Nydegger

(57) ABSTRACT

Viewing operating information of a device is controlled appropriately. A viewing control server has: an identification information manager that acquires, through a network from a manager function that manages one or more devices, device identification information unique to each device, manager identification information unique to each manager function, and customer identification information unique to each customer, and relationally stores the acquired device identification information, manager identification information, and customer identification information; a device information collector that acquires device information, which is operating information of each device, from the manager function through the network; and a viewing controller that identifies the customer identification information according to an operation from an external device, and enables viewing on an external device the device information of a device (Continued)

T1

| USER ID | CUSTOMER NAME |
|---|---|
| *****12 | A |
| *****34 | A |
| *****56 | B |
| *****78 | B |
| ⋮ | ⋮ | identified by the device identification information relationally stored to the identified customer identification information.

6 Claims, 9 Drawing Sheets

(56) References Cited

U.S. PATENT DOCUMENTS

| | | | |
|---|---|---|---|
| 2015/0312427 A1* | 10/2015 | Roulland | H04N 1/00344 358/1.15 |
| 2017/0094447 A1* | 3/2017 | Sasaki | G06F 21/41 |
| 2017/0214824 A1* | 7/2017 | Ooba | H04L 41/085 |
| 2017/0265072 A1 | 9/2017 | Oribe et al. | |

* cited by examiner

T1

| USER ID | CUSTOMER NAME |
|---|---|
| *****12 | A |
| *****34 | A |
| *****56 | B |
| *****78 | B |
| ⋮ | ⋮ |

| SN | MANAGER CODE | CUSTOMER CODE/NAME |
|---|---|---|
| ***abc | apc1 | cc1/A |
| ***def | apc1 | cc1/A |
| ***ghi | apc2 | cc1/A |
| ***jkl | apc3 | cc2/B |
| ***mno | apc3 | cc2/B |
| ⋮ | ⋮ | ⋮ |

FIG. 5B

|  | SN | MANAGER CODE | CUSTOMER CODE/NAME |
|---|---|---|---|
| BEFORE CHANGE OF MANAGER | ***abc | apc1 | cc1/A |
| AFTER CHANGE OF MANAGER | ***abc | apc2 | cc1/A |

FIG. 7A

|  | SN | MANAGER CODE | CUSTOMER CODE/NAME |
|---|---|---|---|
| BEFORE CHANGE OF MANAGER | ***abc | apc1 | cc1/A |
| AFTER CHANGE OF MANAGER | ***abc | apc3 | cc2/B |

FIG. 7B

| USER | SN | MANAGER CODE | CUSTOMER CODE/NAME | VALID/INVALID |
|---|---|---|---|---|
| UA | ***abc | apc1 | cc1/A | INVALID |
| | ***abc | apc2 | cc1/A | VALID |
| | ***def | apc1 | cc1/A | VALID |
| | ***ghi | apc2 | cc1/A | VALID |
| UB | ***jkl | apc3 | cc2/B | VALID |
| | ***mno | apc3 | cc2/B | VALID |

FIG. 8

| USER | SN | MANAGER CODE | CUSTOMER CODE/NAME | VALID/INVALID |
|---|---|---|---|---|
| UA | ***abc | apc1 | cc1/A | INVALID |
|  | ***def | apc1 | cc1/A | VALID |
|  | ***ghi | apc2 | cc1/A | VALID |
| UB | ***jkl | apc3 | cc2/B | VALID |
|  | ***mno | apc3 | cc2/B | VALID |
|  | ***abc | apc3 | cc2/B | VALID |

VIEWING CONTROL SERVER AND VIEWING CONTROL METHOD

BACKGROUND

1. Technical Field

The present invention relates to a viewing control server and a viewing control method.

2. Related Art

In an environment in which multiple printers are managed, operating information about each printer is collected by a server over a network, and the printers are managed by monitoring (remotely monitoring) the collected operating information.

To enable printer customers to view the operating information related to the customer's printers in this type of management system, customers must be previously linked to their own printers. The inputs required to make these links in the related art must be manually input for each printer. The process is therefore tedious and prone to input errors. Security measures are also required to prevent operating information leaking to third parties when viewing the information.

JP-A-2007-280248 describes a server configured to accept new user registration requests when a new user registration request related to a used product is received from a user that does not already have a device (is not registered) and a transfer request from the user registered as the current owner of a device is stored in a storage device. However, if the originally registered owner of the device sells the device without registering a transfer request, the new owner of the device may be able to view the operating information from before the device was sold. A means of easily knowing a change in the status of the printer, such as that the printer was transferred to another party, to assist in appropriate management and viewing is therefore needed.

SUMMARY

An object of the invention is to provide a viewing control server and a viewing control method useful for solving at least one of the foregoing problems.

One aspect of the invention is a viewing control server including: an identification information manager that acquires, through a network from a manager function that manages one or more devices, device identification information unique to each device, manager identification information unique to each manager function, and customer identification information unique to each customer, and relationally stores the acquired device identification information, manager identification information, and customer identification information; a device information collector that acquires device information, which is operating information of each device, from the manager function through the network; and a viewing controller that identifies the customer identification information according to an operation from an external device, and enables viewing on an external device the device information of a device identified by the device identification information relationally stored to the identified customer identification information.

In this configuration, the viewing control server enables a customer of a device to view device information for a device identified by device identification information related to the customer identification information of the customer. The viewing control server acquires from a manager function that manages one or more devices device identification information, manager identification information, and customer identification information, and relationally stores the acquired identification information. As a result, information can be viewed more appropriately than when a person manually inputs and sends to the viewing control server the device identification information for each device. Furthermore, by acquiring relationships between device identification information for each device and manager identification information for the manager function that manages the devices, the viewing control server can identify changes in the status of each device, such as whether a device was sold to another customer, thereby facilitating appropriately managing devices and viewing information.

A viewing control server according to another aspect of the invention also has a customer identification information generator configured to issue the customer identification information; the identification information manager acquiring common customer identification information from multiple manager functions.

In this configuration, the viewing control server issues the customer identification information for each customer. The manager function receives the customer identification information setting issued by the viewing control server, and sends the customer identification information setting with device identification information for each managed device to the viewing control server. As a result, the viewing control server can manage multiple devices managed by different manager functions linked to common customer identification information.

In another aspect of the invention, the identification information manager stores user identification information unique to each user relationally to the customer identification information; and the viewing controller identifies the customer identification information based on the user identification information identified according to the operation, and a relationship between the user identification information and customer identification information.

In this configuration, a user (such as an employee) of a customer (such as a company) can view, by way of the user identification information, device information for devices owned by the user's employer.

In a viewing control server according to another aspect of the invention, when the identification information manager acquires a second combination containing different manager identification information than a previously stored first combination of the device identification information and manager identification information, and relationally stores to the second combination second customer identification information that is different from first customer identification information stored relationally to the first combination, the viewing controller, when the second customer identification information is identified according to the operation, removes from the viewing information the device information of a device identified by device identification information in the first combinations the device information collector collected before acquiring the second combinations.

When the manager identification information related to the device identification information of a particular device is changed, and second customer identification information (identifying a new customer) that is different from first customer identification information (identifying a first customer) is then related to the device identification information of that device, the viewing control server in this configuration does not allow the new customer to view device information that was collected from the device identified by that device identification information before the manager identification information was changed. As a result, when a device is sold to another party, for example, device information related to the owner of the device before the device was resold is prevented from being leaking (being exposed) to the new owner.

In another aspect of the invention, when the identification information manager acquires a second combination with different manager identification information than the first combination, and relationally stored to the second combination second customer identification information different from first customer identification information relationally stored to the first combination, the viewing controller, when the first customer identification information is identified according to the operation, removes from the viewing information the device information of a device identified by the device identification information in the second combination the device information collector collected after acquiring the second combinations.

When the manager identification information related to the device identification information of a particular device is changed, and second customer identification information (identifying a new customer) that is different from first customer identification information (identifying a first customer) is then related to the device identification information of that device, the viewing control server in this configuration does not allow the original (old) customer to view device information that was collected from the device identified by that device identification information after the manager identification information was changed. As a result, when a device is sold to another party, for example, device information related to the new owner of the device is prevented from being leaking (being exposed) to the previous owner after the device is sold.

In another aspect of the invention, when the identification information manager acquires the second combination with different manager identification information than the first combination, and relationally stored to the second combination first customer identification information relationally stored to the first combination, the viewing controller, when the first customer identification information is identified according to the operation, selects for viewing the device information of a device identified by device identification information in the first combination the device information collector collected before the second combination was acquired, and the device information of a device identified by device identification information in the second combination the device information collector collected after acquiring the second combination.

When the manager identification information related to the device identification information of a particular device is changed, and the first customer identification information (identifying the same customer) is related to the device identification information, the viewing control server in this configuration enables the original customer to view device information that was collected from the device identified by that device identification information before the manager identification information changed, as well as device information collected from the device identified by that device identification information after the manager identification information changed. As a result, when the location (including when the computer connected to the device changes, for example) of a device changes inside the same company (customer), or other change in the relationship between device and manager function that does not involve reselling or a change in ownership, for example, occurs, the same customer can also view device information from before the change after the change is made.

The technical concept of the invention can be embodied in many forms other than a viewing control server. For example, the invention may be embodied by a method (viewing control method) including the steps executed by the parts of the viewing control server, by a program causing hardware (a computer) to execute the method, and a computer-readable storage medium storing the program.

The invention may also be described as a system including the viewing control server and other devices, a method corresponding to the process steps executed by devices in the system, and a program.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 5A shows an example of a table T1 defining user ID and customer name relations,
and FIG. 5B shows an example of a table T2 defining relationships between serial numbers, manager codes, and customer codes.
FIG. 7A shows an example of manager codes and customer codes related before and after the manager of a device is changed for a device in the same customer,
and FIG. 7B shows an example of manager codes and customer codes related before and after the manager of a device is changed in conjunction with a change in the customer.
FIG. 8 shows an example of correlations between the user that input login information in step S600, and combinations of information that is extracted in step S630.
FIG. 9 shows another example of correlations between the user that input login information in step S600, and combinations of information that is extracted in step S630.

DESCRIPTION OF EMBODIMENTS

Preferred embodiments of the present invention are described below with reference to the accompanying figures. Note that the accompanying figures are for descriptive purposes only.

1. System Configuration

Figure 1:
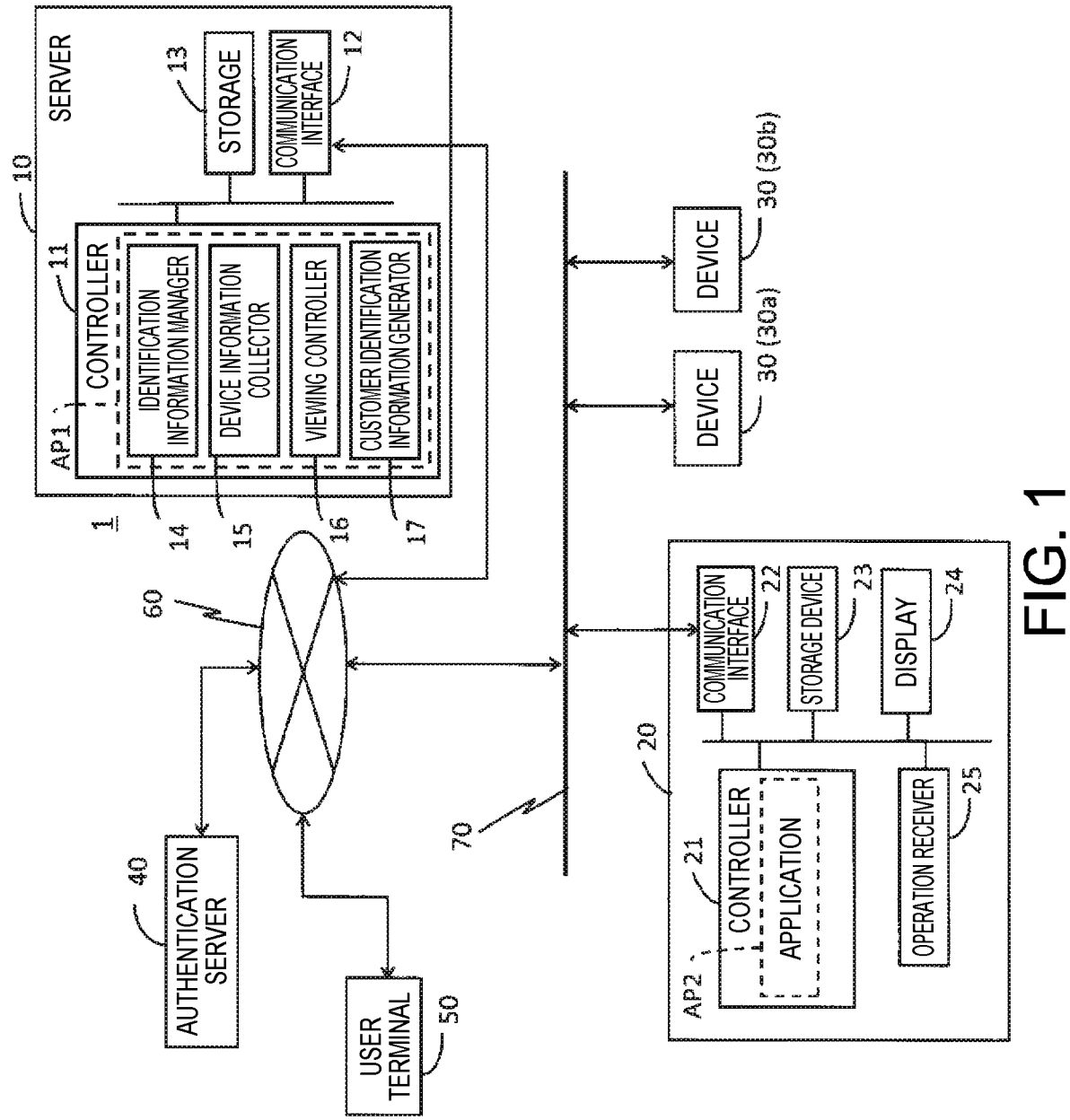
FIG. 1 schematically illustrates the system configuration.

FIG. 1 schematically illustrates the system configuration. This system 1 may be called a remote device monitoring system, or a device information viewing system, for example. The system 1 includes a server 10 and a device management terminal 20.

The server 10 is an example of a viewing control server. The server 10 runs a viewing control method. However, viewing control server is only one example of the server name, and the server 10 may also be referred to as a remote monitoring server or a device information collection server, for example.

The server 10 and device management terminal 20 are both connected to a network 60, and communicate through the network 60. The network 60 includes a public network such as the Internet, and private LANs (local area networks) connected to such a public network.

The device management terminal 20 is connected to one or more devices 30 (such as devices 30*a*, 30*b*). The device management terminal 20 and devices 30 are communicatively connected through a network 70 such as a wired or wireless LAN that connects to the network 60 through a router not shown, for example. The network 70 may be considered part of network 60. In the example in FIG. 1, the device management terminal 20 connects to the network 60 through network 70.

An example of a device 30 is a printer. A printer is any device with at least a printing function, and may include multifunction devices incorporating multiple functions such as scanner and fax capabilities. The printing method used by the printer may be inkjet or electrophotographic (laser), for example. However, devices 30 as supposed by the invention are not limited to printers, and include any device from which operating information may be collected through a network for remote monitoring and viewing information. Note that the device 30 may communicatively connect to the device management terminal 20 not through the network 70 but instead through a USB (Universal Serial Bus) cable, for example.

The server 10 includes a controller 11, communication interface 12, and storage 13.

The server 10 is embodied by one or multiple information processing devices that function as servers on the network 60.

The controller 11 is configured with one or more IC chips including a CPU, ROM, and RAM, and memory. The controller 11 controls behavior of the server 10 by the CPU using RAM or other memory as working memory to execute computing processes defined by a program stored in ROM or other memory. The functions the controller 11 embodies by running the program include an identification information manager 14, device information collector 15, viewing controller 16, and customer identification information generator 17. The identification information manager 14, device information collector 15, viewing controller 16, and customer identification information generator 17 may also be considered functions provided by an application AP1 installed on the server 10.

The communication interface 12 is a general term for an interface for communicating with an external device through a network 60 according to a specific communication protocol.

The storage 13 is configured from a storage device such as a hard disk drive or flash memory, or part of the controller 11. Note that the storage 13 may be a server (database) separate from the information processing device including the controller 11, and a group of such multiple devices may be referred to as collectively as the server 10.

The device management terminal 20 is configured with a controller 21, communication interface 22, storage device 23, display 24, and operation receiver 25. The device management terminal 20 is embodied by a personal computer (PC) or a terminal with processing capacity comparable to a PC.

The controller 21 is configured with one or more IC chips including a CPU, ROM, and RAM, and memory. The controller 21 controls behavior of the device management terminal 20 by the CPU using RAM or other memory as working memory to execute computing processes defined by a program stored in ROM or other memory.

The communication interface 22 is a general term for an interface for communicating with an external device through a network 60, 70 according to a specific communication protocol.

The storage 23 is configured from a storage device such as a hard disk drive or flash memory, or part of the controller 21.

The display 24 is a means of visually presenting information, and in this example is a LCD or OLED display device. The display 24 may also be a configuration including a display and a drive circuit for driving the display.

The operation receiver 25 is a means of receiving user operations (inputs), and may be configured with physical buttons, a touch panel, a mouse, or a keyboard, for example. The touch panel may also embody functions of the display 24. Further alternatively, the display 24 and operation receiver 25 together may be referred to as an operating panel.

An application AP2 is installed on the device management terminal 20, and the controller 21 manages the devices 30 to be managed using the application AP2. Managing devices 30 can be handled in many ways, such as a process for acquiring specific information from a device 30, and providing necessary information to a device 30 (such as a process of updating the firmware of a device 30). The device management terminal 20 may thus be referred to as a means embodying a manager function for managing one or more devices 30. More specifically, the application AP2, or a controller 21 executing the application AP2, is equivalent to a manager function.

The system 1 may also be configured to include a authentication server 40. The authentication server 40 is connected to the network 60, and is embodied by one or multiple information processing devices that function as a server on the network 60. As described further below, the authentication server 40 stores personal information (user information) for each user, and executes a user authentication process based on the user information each time a user attempts to log in to the server 10 to access a service provided by the system 1 (server 10). The authentication server 40 does not need to be a authentication means dedicated to the system 1 according to this embodiment of the invention. In other words, the authentication server 40 may be a shared authentication means that is also used to authenticate users that receive services through a network 60 (Internet).

By operating a user terminal 50 that connects to the network 60 and is capable of browsing information provided over the network 60, the user logs into the server 10 and can receive services provided by the server 10. Examples of a user terminal 50 include a PC, smartphone, tablet terminal, cell phone, or other communication device.

2. Collecting Device Information

Collecting device information through the relationship between the device 30, device management terminal 20, and server 10 is described briefly next.

The controller 21 of the device management terminal 20 (application AP2) communicates with the devices 30 to manage (referred to below as the target devices 30) and acquires device information, which is operating information for the target device 30. In the example in FIG. 1, the device management terminal 20 acquires device information from devices 30*a* and 30*b*, which are devices the device management terminal 20 manages. Only one device management terminal 20 is shown in FIG. 1, but there may be multiple device management terminals 20 in the system 1. Each of the multiple device management terminals 20 acquires device information from each device 30 the device management terminal 20 manages.

The device information may include, for example, error information, status information, job information, event information, or maintenance information for the device 30.

Error information is information identifying when an error (such as a paper jam) occurs on the device 30 and the content of the error. Status information is information indicating when device 30 power turns on and off, or the remaining ink level of the device 30 (printer), for example. Job information is information indicating the content of a job (such as a print job) executed by the device 30 (printer). Event information is information related to an event, such as a nozzle check or nozzle cleaning, that occurred on the device 30 (printer). Maintenance information is information related to the replacement history or service life of parts of the device 30.

The controller 21 (application AP2) requests device information from each managed device 30 regularly or irregularly through the communication interface 22, and acquires device information from each device 30 in response to the request. Alternatively, the device 30 may automatically send its own device information as necessary to the device management terminal 20 that manages the device 30. The controller 21 stores the acquired device information acquired from the target devices 30 in the storage device 23 relationally to the device identification information unique to the device 30 from which the device information originated.

Device identification information is information that uniquely identifies an individual device 30, and may be the network address of the device, but in this example is the serial number of the device 30. The serial number may be abbreviated as SN, particularly in the figures.

The controller 21 (application AP2) sends (uploads) the device information of each device 30 stored in the storage device 23 regularly or irregularly through the communication interface 22 to the server 10. In this case, the controller 21 sends the device information for a device 30 with the serial number of that device 30 to the server 10. As a result, on the server 10 side, the controller (device information collector 15) acquires through the network 60 device information for each device 30 each device management terminal 20 (the application AP2 (manager function) installed on each device management terminal 20) manages. The device information collector 15 stores the collected device information relationally to the corresponding serial number in the storage 13. As a result, device information for each device 30 (serial number) accumulates in the storage 13.

While not shown in FIG. 1, included in the system 1 is a terminal used by an operator in the business (such as printer manufacturer) that manages and runs the server 10, for example. By operating the terminal, the operator can access the device information that accumulates in the server 10 (storage 13) as described above. By accessing the device information as a work task, the operator can monitor the status of each device 30, and can appropriately provide useful information to the user of the device 30 (such as how to resolve an error that occurred on the device 30, and operating tips related to conserving consumables such as ink).

In this embodiment of the invention, as described below, a user of a device 30 can also view the device information (at least part of the device information) stored on the server 10 (storage 13).

3. Device Installation Process

The process the user uses to install and set up a device 30 is described next. To enable using a device 30 when a new device 30 is purchased, for example, the user connects the device 30 to the device management terminal 20 and executes a specific set-up process. Before or after setting up the device 30, the user installs the application AP2 to the device management terminal 20.

Figure 2:
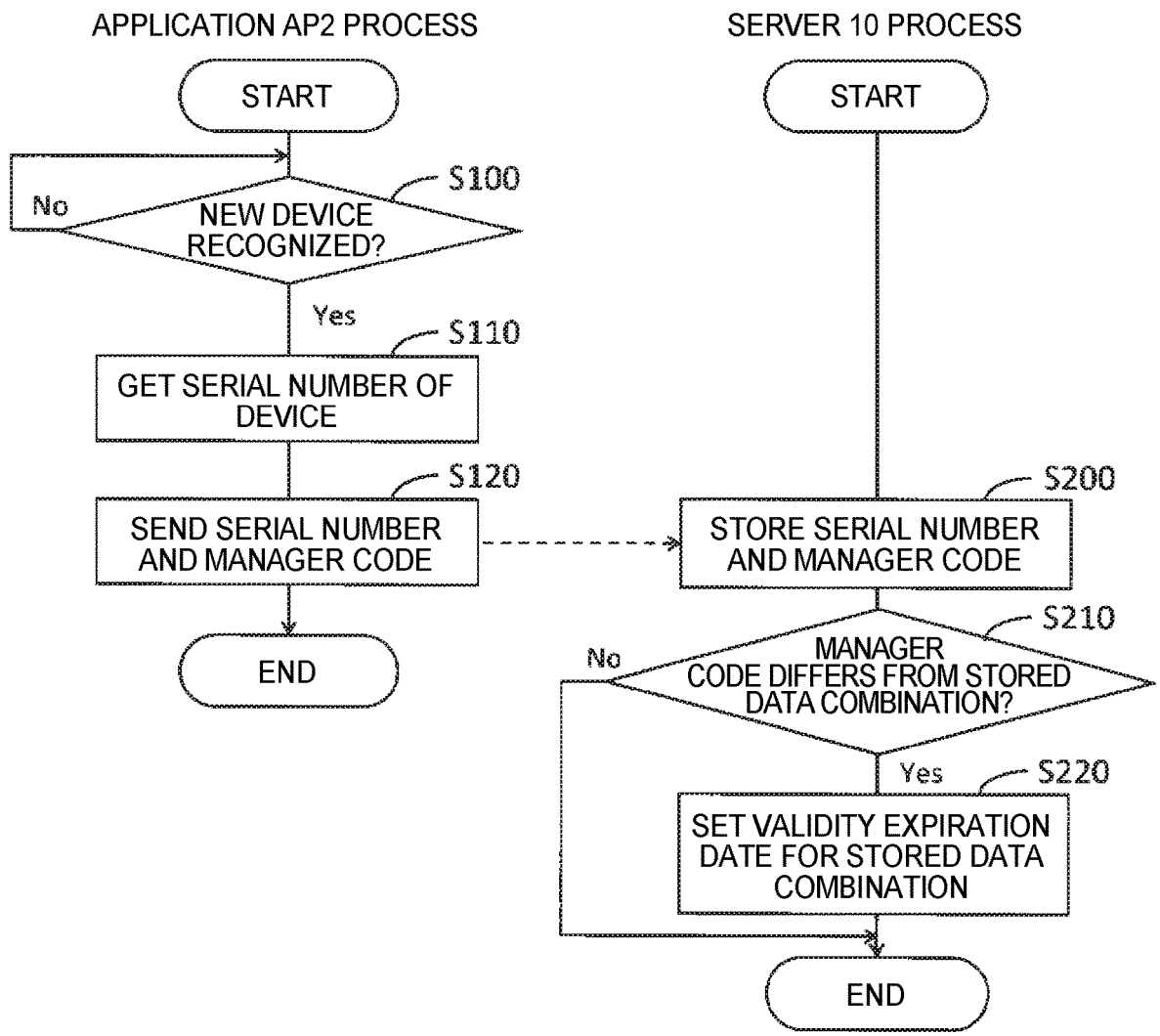
FIG. 2 is a flow chart of the processes of the application AP2 and server 10 during the device installation process.

FIG. 2 is a flow chart showing in parallel the process of the application AP2 installed to the device management terminal 20 (the controller 21), and the process run on the server 10. The process shown in FIG. 2 is also referred to as a device installation process.

The controller 21 (application AP2) constantly looks for recognizable devices 30 through the communication interface 22, and when a new device 30 that was not previously recognized is found (step S100 returns Yes), control goes to step S110. Step S100 repeats while a new device 30 is not found. In FIG. 1, for example, if device 30a is connected to the network 70 (the controller 21 already recognizes the device 30a through the communication interface 22), and the user then connects device 30b to the network 70 and executes the specific set-up process, the controller 21 recognizes the new device 30b through the communication interface 22. In this event, the controller 21 determines that a new device 30 was recognized.

Instep S110, the controller 21 (application AP2) acquires the device identification information (serial number) from the new device 30 recognized in step S100. Note that because the controller 21 acquires a serial number that was not previously acquired from a new device 30 that became able to communicate, when a new device 30 is recognized and step S100 returns Yes, step S110 can also be considered to have effectively been completed.

In step S120, the controller 21 (application AP2) sends to the server 10 through the communication interface 22 the serial number acquired in step S110 and manager identification information (manager code) unique to itself (application AP2). The application AP2 is software that is sold or distributed for free. The manager code is identification information unique to the software (application AP2), and is issued after the application AP2 is installed, or is issued as a product key or license number previously assigned to a specific copy of the application AP2 by the distributor of the application AP2.

On the server 10 side, the controller 11 (identification information manager 14) receives through the network 60 the serial number and manager code of the device 30 sent from the device management terminal 20, and stores the received serial number and manager code pair in the storage 13 (step S200). The foregoing is the basic outline of the device installation process. The controller 21 (application AP2) thereafter treats the recognized device 30 as a device 30 the controller 21 (application AP2) manages and collects device information from.

The processes of steps S210 and S220 in FIG. 2 are described below in section 7, customer code resetting process.

4. User Registration Process

The user of a device 30 can register himself (execute a user registration process) in preparation to receive services provided by the server 10. For example, the user that installed the device 30 as described above registers as a user.

Figure 3:
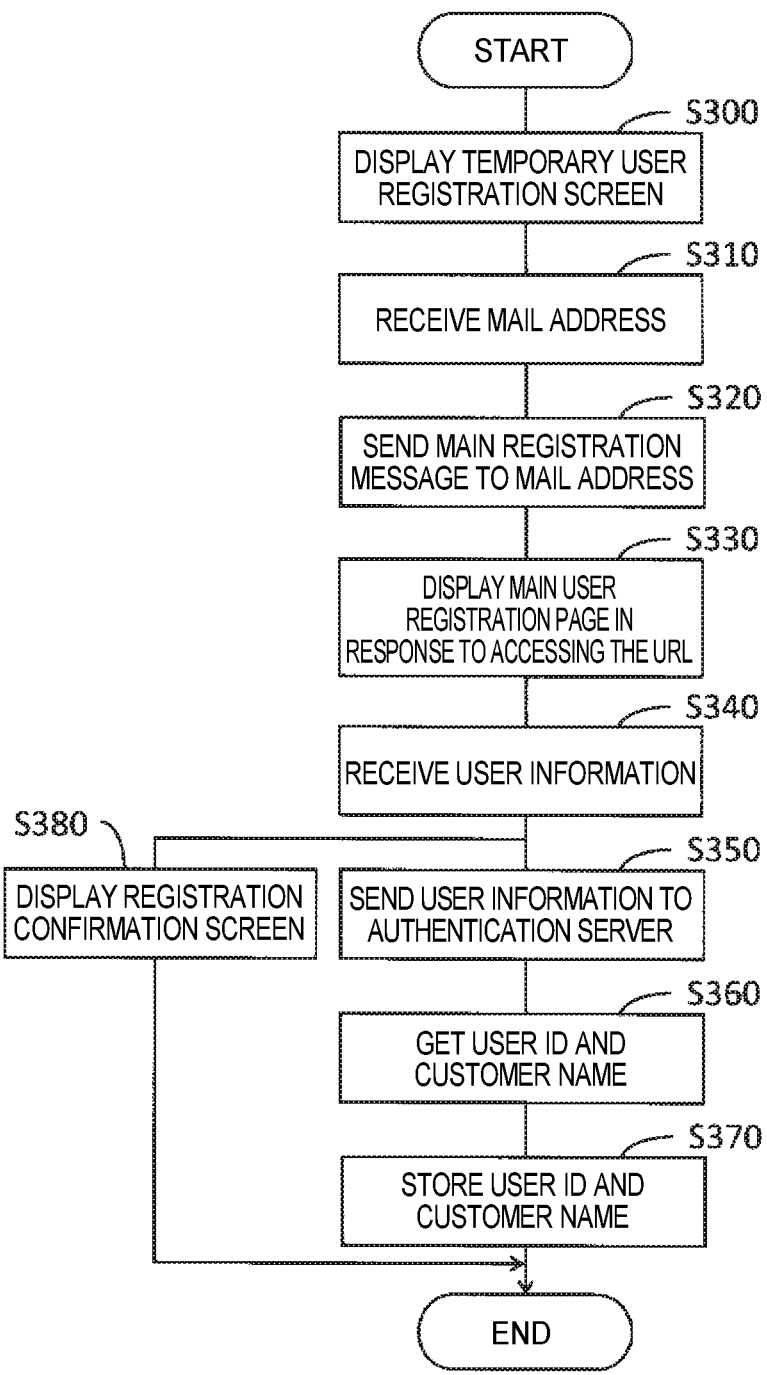
FIG. 3 is a flow chart of the user registration process.

FIG. 3 is a flow chart of the user registration process the server 10 executes. The server 10 executes the user registration process in response to user operation of the user terminal 50.

The controller 11 of the server 10 causes the display of the user terminal 50 to present a temporary user registration screen (step S300).

The temporary user registration screen is a web page the server 10 provides over the network 60, and is displayed based on data written in HTML (Hyper Text Markup Language). In other words, the user operates the user terminal 50 to start a browser installed on the user terminal 50, and through functions of the browser displays a temporary user registration screen provided by the server 10 on the display of the user terminal 50. The temporary user registration screen is an example of a first user interface.

Next, the controller 11, through the temporary user registration screen, receives the mail address input by the user (step S310). In other words, the temporary user registration screen is a user interface for inputting the mail address used to contact the user, and the user, following prompts on the temporary user registration screen, inputs the user's mail address.

The controller 11 sends an e-mail message (main registration message) to the mail address received through the temporary user registration screen (step S320). The controller 11 only uses the mail address received through the temporary user registration screen as the address for the main registration message, and does not store the mail address.

The main registration message contains the URL (Uniform Resource Locator) of the main user registration screen. Therefore, by operating the user terminal 50 to access (clicking or tapping) the link containing the URL in the main registration message, the user can display the main user registration screen. More specifically, the controller 11 displays the main user registration page on the display of the user terminal 50 by accessing the URL (step S330). The main user registration screen is an example of another web page the server 10 provides over the network 60. The main user registration screen is an example of a second user interface.

The controller 11 receives the user information from the user through the main user registration screen (step S340). In other words, the main user registration screen is a user interface for inputting user information, and the user inputs the user's user information according to prompts on the main user registration screen.

Examples of user information include the user name, mail address, password, customer name, and telephone number.

The mail address of the user information is the same as the mail address input to the temporary user registration screen.

The password is a string set as desired by the user.

The customer name is typically the name of the company, organization, or other group with which the user is associated. For example, a company that owns the device management terminal 20 and the devices 30 managed by the device management terminal 20 is a customer in this system 1, and employees and managers of the company are individual users. Therefore, the user inputs the name of the company or organization to which the user belongs as the customer name through the main user registration screen. However, the customer is not limited to organizations such as corporations, and a customer may be an individual, such as the owner of a private business.

The controller 11 registers the user information in the authentication server 40 by sending the user information received through the main user registration screen to the authentication server 40 (step S350). The authentication server 40 stores the user information sent from the server 10. In other words, for the protection of personal information, the user information is stored only by the authentication server 40, and is not stored by the server 10, in this embodiment of the invention.

The authentication server 40 generates unique identification information (user ID) for each instance of user information for one person (user) sent from the server 10, and stores the user ID relationally to the user information. In other words, the authentication server 40 uses the user ID to manage the user information of each user.

A user ID is an example of user identification information in the invention. The authentication server 40 also sends the user ID assigned to the user information and the customer name, which is part of the user information, to the server 10 that sent the user information. As a result, the controller 11 of the server 10 acquires from the authentication server 40 a user ID and customer name pair (step S360).

The controller 11 (identification information manager 14) stores the combination of user ID and customer name acquired from the authentication server 40 in the storage 13 (step S370).

The controller 11, after receiving the user information through the main user registration screen in step S340 (for example, after a specific button designed into the main user registration screen (such as an enter button or send button) is operated), changes the display on the user terminal 50 to a registration confirmation screen (step S380). The processes of step S380 and steps S350 to S370 run parallel to each other.

The registration confirmation screen is another type of web page provided by the server 10 over the network 60. The registration confirmation screen is an example of a third user interface. The registration confirmation screen is a screen reporting completion of the user registration process to the user. A message prompting the user to set the customer name on the device management terminal 20 is included in the registration confirmation screen. Reading the message, the user knows to execute the process (customer code setting process) for setting the customer name on the device management terminal 20. The customer code setting process is described below.

Note that when the controller 11 receives input of the mail address through the temporary user registration screen (step S310), the controller 11 may query the authentication server 40 to determine if the received mail address is already registered. If the authentication server 40 that received the query finds that the queried mail address is found in user information already relationally stored to the user ID, the authentication server 40 returns to the server 10 a message that the mail address is already used and unsuitable for a new user registration. However, if the queried mail address is not found in user information already relationally stored to the user ID, the authentication server 40 returns to the server 10 a message that the mail address can be used for a new user registration. If the controller 11 receives a reply that the mail address cannot be used for a new user registration, the user is requested to input a different mail address through the temporary user registration screen, and as a result, input of a usable mail address that is not the same as a mail address already registered in the authentication server 40 can be received (step S310).

After sending the user ID and customer name to the server 10 as described above, the authentication server 40 may send user registration process completion report to the mail address contained in the user information related to the user ID. The user, by reading the registration confirmation screen (step S380), can know that the user registration process was completed, but can also know that the user registration process was completed by reading the mail message.

5. Customer Code Setting Process

Figure 4:
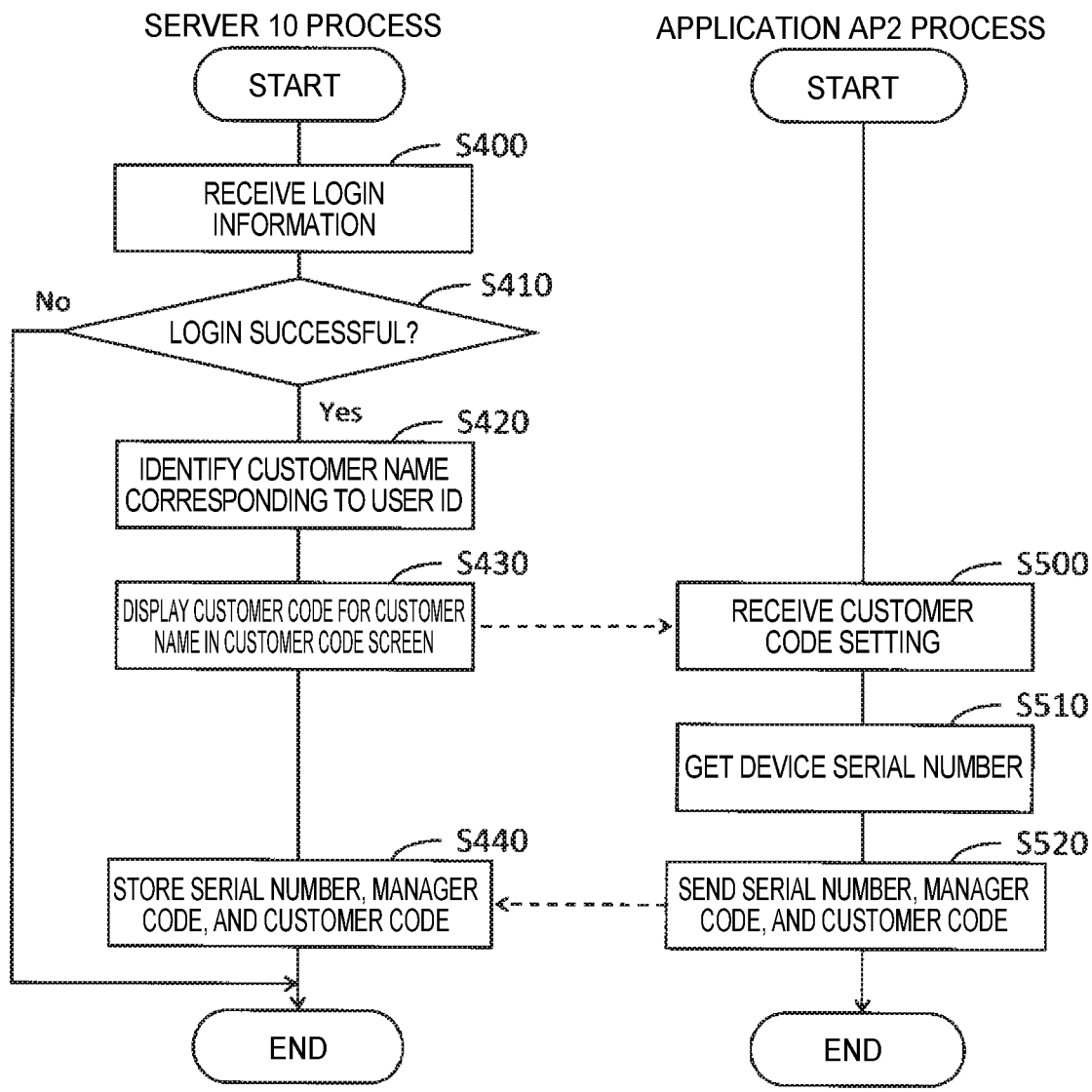
FIG. 4 is a flow chart of the processes of the application AP2 and server 10 during the customer code setting process.

FIG. 4 is a flow chart of the process of the application AP2 installed on the controller 21 of the device management terminal 20, and the process of the server 10, in the customer code setting process.

The controller 11 of the server 10 receives input of login information from the user (step S400). More specifically, the user wanting to start the customer code setting process operates the user terminal 50 and by functions of the web browser displays a specific login screen, which is a web page provided by the server 10 over the network, on the display of the user terminal 50. The user operates the user terminal 50 to input the user's login information to the login screen.

The login information is the user's mail address and password registered on the authentication server 40 in the user registration process described above through the main user registration screen. The login information is an example of authentication information.

The controller 11 sends the input login information together with an authentication request to the authentication server 40, and waits for the authentication result. The authentication server 40 determines whether or not a combination of mail address and password matching the login information sent with the authentication request from the server 10 is already stored as part of the user information related to a user ID.

If a combination of mail address and password matching the login information sent with the authentication request from the server 10 is already stored, the authentication server 40 returns to the server 10 an authentication success report, that is, a report that the user attempting to log in is a registered user.

However, if a combination of mail address and password matching the login information sent with the authentication request from the server 10 is not already stored, the authentication server 40 returns to the server 10 an authentication failure report, that is, a report that the user attempting to log in is not a registered user.

The controller 11 waiting for an authentication result from the authentication server 40 determines login was successful when an authentication success report is received as the authentication result (step S410 returns Yes), and goes to step S420.

However, when an authentication failure report is received as the authentication result (step S410 returns No), the controller 11 ends the process of the flow chart in FIG. 4. When the controller 11 determines login failed, it may present a message such as "login failed" on the login screen displayed by the user terminal 50.

When a combination of mail address and password matching the login information sent with the authentication request from the server 10 is already stored, the authentication server 40 returns an authentication success report and the user ID to the server 10. The user ID returned in this communication is obviously the user ID relationally stored to the combination of mail address and password that matches the login information sent with the authentication request. Therefore, the controller 11 waiting for an authentication result determines login was successful when the user ID is returned from the authentication server 40 (step S410 returns Yes), and determines login failed when the user ID is not returned (step S410 returns No).

In step S420, the controller 11 identifies the customer name related to the user ID acquired from the authentication server 40 as the reply to the authentication request.

FIG. 5A shows an example of a table T1 defining relationships between user IDs and customer names. The server 10 stores the table T1 in the storage 13. As described above, in the user registration process, the controller 11 (identification information manager 14) stores, in step S370 (FIG. 3), the user ID and customer name combination acquired from the authentication server 40 in the storage 13. The controller 11 then adds the user ID and customer name combination acquired from the authentication server 40 to the table T1. As a result, in step S420, the controller 11 can, by referencing the table T1, determine the customer name corresponding to the user ID acquired from the authentication server 40 in reply to the authentication request.

In step S430, the controller 11 (customer identification information generator 17) displays the customer code corresponding to the customer name acquired in step S420 in a customer code screen. The customer code screen is a screen displayed after the login screen through which the login information input was received from the user. In other words, when login is successful instep S410, the controller 11 goes through step S420 and then changes the login screen displayed on the user terminal 50 to the customer code screen, and in step S430 displays the customer code in the customer code screen. The time delay experienced by the user that input the user's previously registered login information in step S400 between when the user inputs the login information and when the customer code screen is displayed with the customer code is extremely short.

A customer code is customer identification information unique to a specific customer (customer name), and is issued (generated) by the controller 11 (customer identification information generator 17). After issuing a customer code for a customer, the correlation between customer name and customer code does not change. When the customer name is identified in step S420 and a customer code has already been issued for that customer name, the controller 11 (customer identification information generator 17) displays the issued customer code in the customer code screen (step S430).

However, if when the customer name is identified in step S420 a customer code has not been issued for the customer name, a new customer code that does not match any other previously issued customer code is issued for that customer name, and the new customer code is displayed in the customer code screen (step S430).

By viewing the customer code screen, the user can know the customer code the server 10 assigned to the company or other entity (customer) the user belongs to.

Knowing the customer code, the user then sets the customer code in the device management terminal 20. In other words, the user, by operating the operation receiver 25 of the device management terminal 20, inputs and sets the customer code now known as described above.

The controller 21 (application AP2) of the device management terminal 20 receives the customer code set by operation of the operation receiver 25 (step S500).

Instep S510, the controller 21 (application AP2) acquires the serial number from each device 30 that is managed.

In step S520, the controller 21 (application AP2) sends the serial number acquired in step S510, the manager code of the controller 21 (application AP2), and the customer code setting that was received in step S500 through the communication interface 22 to the server 10.

On the server 10 side, the controller 11 (identification information manager 14) receives the serial number, manager code, and customer code sent from the device management terminal 20 through the network 60, and stores the received combination of serial number, manager code, and customer code in the storage 13 (step S440).

FIG. 5B shows an example of a table T2 defining relationships between the device 30 serial number, the manager code of the manager function (application AP2) managing the device 30, and the customer code. The server 10 stores the table T2 in the storage 13. As described above, in the customer code setting process, the controller 11 (identification information manager 14) stores, instep S440 (FIG. 4), the combination of serial number, manager code, and customer code acquired from the device management terminal 20 in the storage 13. At this time, the controller 11 ads the combination of serial number, manager code, and customer code acquired from the device management terminal 20 to the table T2. As described above, there is a one-to-one relation between the customer code and customer name. As a result, the table T2 shown in the example in FIG. 5B also stores the customer name corresponding to the customer code.

6. Viewing Control Process

The process of the server 10 controlling viewing device information as described below supposes that the processes described above have already been executed.

Figure 6:
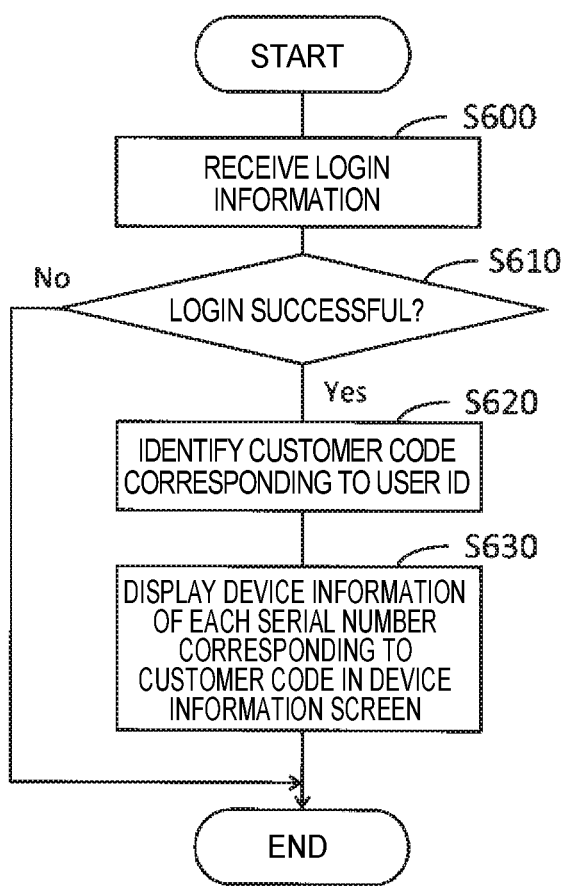
FIG. 6 is a flow chart of a viewing control process.

FIG. 6 is a flow chart of the viewing control process of the server 10.

The controller 11 of the server 10 receives input of the user login information (step S600). More specifically, the user attempting to view device information operates the user terminal 50 and through a function of the web browser displays a specific login screen on the display of the user terminal 50. The user then operates the user terminal 50 to input the user's login information to the login screen. Steps S600 and S610 are basically the same as steps S400 and S410 (FIG. 4), and further description thereof is omitted. In other words, user authentication based on the login information is handled by the authentication server 40.

If login is determined successful in step S610 (step S610 returns Yes), the controller 11 (viewing controller 16) identifies the customer code corresponding to the user ID sent from the authentication server 40 used to determine login was successful in step S610 (step S620). The customer code corresponding to the user ID can be easily determined by referencing table T1 and table T2.

Next, in step S630, the controller 11 (viewing controller 16) displays in the device information screen the device information for the device 30 identified by the serial number related to the customer code identified in step S620.

The device information screen is the screen displayed after the login screen through which login information was input by the user. More specifically, when login is determined successful in step S610, the controller 11 executes step S620, changes the login screen presented on the user terminal 50 with the device information screen, and displays the device information in the device information screen in step S630.

The time delay experienced by the user that input the user's previously registered login information in step S600 between when the user inputs the login information and when the device information screen is displayed with the device information is extremely short.

Because the customer code and serial number have already been related by the customer code setting process (FIG. 4) when the viewing control process in the flow chart in FIG. 6 executes, a device information screen containing the device information can be displayed.

In this example, the user ID (the user ID of the user that input the user's previously registered login information in order to view the device information) the controller 11 acquired from the authentication server 40 to determine login success in step S610 is assumed to be ***12 (see FIG. 5A). In tables T1 and T2 in FIG. 5A and FIG. 5B, the customer code related to the user ID *12 is cc1. The serial numbers related to the customer code cc1 are *abc, *def, and *ghi. As a result, in step S630, the controller 11 (viewing controller 16) displays in the device information screen the device information currently stored in the storage 13 for serial numbers *abc, *def, and ***ghi (device information for three devices 30), enabling the user that successfully logged in to view the device information on the user terminal 50.

The display format of the device information for each device 30 in the device information screen is not specifically limited. For example, the controller 11 (viewing controller 16) may display device information for multiple devices 30 in a list in a single screen, generate multiple screens displaying detailed device information for each device 30, and cause the user to view device information for each device 30 by switching between the screens.

7. Customer Code Resetting Process

The relationship between a specific device 30 and the manager function (application AP2) managing that device may end, and that device 30 may then be managed by a different manager function (application AP2), that is, the manager may change. Examples of cases in which the manager changes are described below.

Example 1: In company A (company name A), the location of a device 30 or device management terminal 20 changes, and the device 30 is connected to a device management terminal 20 other than the device management terminal 20 to which was previously connected Example 2: In company A (company name A), the application AP2 installed on the device management terminal 20 to which a device 30 is connected, and the application AP2 is replaced with a new application AP2

Example 3: A device management terminal 20 used connected to a device management terminal 20 in company A (company name A) is sold to a different company B (customer name B), and is connected to a separate device management terminal 20 belonging to company B In examples 1 and 2, the relationship between the device 30 and the entity (customer) owning the device 30 does not change. In example 3, the relationship between the device 30 and the entity (customer) owning the device 30 changes. For convenience below when describing operation when there is a change of manager, the manager code of the manager function (application AP2) linked to the serial number of the device 30 before the manager change is referred to as the old manager code, and the manager code of the manager function (application AP2) linked to the serial number of the same device 30 after the manager change is referred to as the new manager code.

FIG. 2 (device installation process) is described next. As described above, when the controller 21 of the device management terminal 20 (application AP2) detects a new device 30 that was not previously recognized (step S100 returns Yes), steps S110, S120 execute. Therefore, in addition to when a newly purchased device 30 is first connected to the device management terminal 20, when the manager of a device 30 changes as in the foregoing examples, the device installation process is started by the new manager function (application AP2), step S100 returns Yes, and steps S110, S120 are executed. As a result, as shown in FIG. 2, the controller 11 of the server 10 executes steps S210, S220 after step S200.

In step S210, the controller 11 (identification information manager 14) compares the combinations of registered information stored in the storage 13 before step S200 with the combination of serial number and manager code stored in the storage 13 in step S200, and determines if a combination of information having the same serial number and a different manager code is contained in the already stored information (Yes) or is not already stored (No). If the serial number stored in the storage 13 in step S200 is a serial number not already stored in the storage 13, the controller 11 returns No in step S210, and ends the process of the flow chart in FIG. 2. However, if the serial number stored in the storage 13 in step S200 is a serial number already stored in the storage 13, the controller 11, but the manager code already stored in the storage 13 relationally to that serial number is different from the serial number relationally stored in the storage 13 to that serial number in step S200, the controller 11 returns Yes in step S210 and then goes to step S220.

A Yes determination in step S210 means that there was a change in the manager of the device 30. Suppose, for example, that a table T2 such as shown in FIG. 5B is stored in the storage 13 of the server 10, and the controller 11 receives a combination of serial number *abc and some manager code in step S200, and relationally stores that serial number and manager code combination in the storage 13. If the manager code (new manager code) relationally stored to serial number *abc is, for example, apc2 or apc3, the new manager code is different from the manager code apc1 (old manager code) already relationally stored in the table T2 to the serial number ***abc, and step S210 therefore returns Yes.

In step S220, the controller 11 (identification information manager 14) sets a validity expiration date for the combination of previously stored information determined in the comparison in step S210 to have the same serial number and a different manager code than the serial number and manager code combination stored in the storage device 13 in step S200. The controller 11 then ends the process of the flow chart in FIG. 2.

In another example, suppose that a table T2 such as shown in FIG. 5B is stored in the storage 13 of the server 10, and the controller 11 receives a combination of serial number ***abc and manager code apc2 (new manager code) in step S200, and relationally stores the serial number and manager code combination in the storage 13. In this case, because the new manager code is different from the manager code apc1 (old manager code) step S210 returns Yes.

In this case, in step S220, the controller 11 sets a validity expiration date for the combination of previously stored information having the same serial number and a different manager code (in table T2, the combination of serial number ***abc, manager code apc1, and customer code cc1 (and company name A)). In this example, the validity expiration date is set to the date and time step S220 executes.

The combination of information already stored in the storage 13 for which a validity expiration date was set in step S220 (the combination of serial number, manager code, customer code (and company name)) is referred to as an invalid combination of information below. The device information corresponding to the invalid combination of information is referred to as expired device information.

The device information corresponding to an invalid combination of information is the device information of the device 30 of the serial number contained in the invalid combination of information, and means device information collected and stored in the storage 13 by the device information collector 15 before the present (validity expiration date). Device information collected and stored in the storage 13 after the validity expiration date (through the manager function after the manager change) is not device information corresponding to an invalid combination of information (expired device information) even if it is device information for a device 30 of a serial number contained in an invalid combination of information. Of course, device information collected and stored in the storage 13 from a device 30 for which there is not a manager change is not device information corresponding to an invalid combination of information (expired device information).

After the manager of a device 30 changes, the user executes the customer code setting process to relate the customer code to the serial number (and manager code) of the device 30 for which the manager changed. The customer code setting process executed after the device 30 manager changes is referred to in this embodiment as a customer code resetting process. The customer code resetting process is basically the same as the customer code setting process (FIG. 4).

In the customer code resetting process executed after the manager change in example 1 and example 2, the customer code related to the serial number of the device 30 for which the manager changed does not change from the customer code before the manager change. More specifically, the customer code setting process executed before the manager change, and the customer code resetting process executed after the manager change, are both executed by a user in company A (a user that has completed user registration). As a result, in step S440 (FIG. 4) of the customer code resetting process, the customer code relationally stored to the serial number of the device 30 for which the manager changed is the customer code issued for the same customer, company A.

FIG. 7A shows an example of manager code and customer code (and customer name) relations before and after the manager change when the manager of a device 30 (serial number *abc) is changed as described in example 1 and example 2. In example 1 and example 2, the manager function that manages the device 30 of serial number *abc is changed in company A from application AP2 with a manager code of apc1 to application AP2 with a manager code of apc2. Because the manager changes within company A, even after the customer code resetting process (FIG. 4), the customer code related to the device 30 of serial number ***abc does not change (remains cc1). The combination of information before the manager change in FIG. 7A is an example of an invalid combination of information due to a change of manager.

However, when the customer code resetting process is executed after there is a change of manager in conjunction with the transfer of a device 30 as described in example 3, the customer code related to the serial number of the device 30 affected by the change of manager differs from the customer code related to the serial number before the change. This is because the customer code setting process executed before the change of manager is executed by a user (a user that has completed a user registration) associated with company A, and the customer code resetting process executed after the change of manager is executed by a user associated with company B. Of course, the user associated with company B executes the customer code resetting process after completing the user registration process (FIG. 3) described above. That is, in step S440 (FIG. 4) of the customer code resetting process executed after there is a change of manager in conjunction with transfer of a device 30 as in example 3, the customer code relationally stored to the serial number of the device 30 for which the manager changed is the customer code issued to company B, the customer to which the device 30 was sold.

FIG. 7B shows an example of manager code and customer code (and customer name) relations before and after the manager change when the manager of a device 30 (serial number *abc) is changed as described in example 3. In example 3, because the device 30 of serial number *abc was sold from company A to company B, the manager function that manages the device 30 is changed from application AP2 of manager code of apc1 in company A to application AP2 of manager code of apc3 in company B. In addition, the customer code related to device 30 of serial number *abc is changed in the customer code resetting process from the previously registered cc1 to cc2. The combination of information before the manager change in FIG. 7**B is an example of an invalid combination of information due to a change of manager.

When a change of manager occurs for a device 30 of a particular serial number as described above, the storage 13 stores both the combination of information before the change of manager (an invalid combination of information) and the combination of information after the change of manager in table T2 as shown in FIG. 7A and FIG. 7B.

Note that when a customer code setting is received in step S500 (FIG. 4), the controller 21 of the device management terminal 20 (application AP2) sets the newest customer code setting by overwriting the customer code that was previously set. Note that executing steps S510, S520 is not limited to immediately after step S500, and may be executed each time the controller 21 (application AP2) boots up, or each time a managed device 30 turns on.

A viewing control process reflecting a change of manager is described next. Step S630 (FIG. 6) is described in detail below. In step S630, the controller 11 (viewing controller 16) first extracts combinations of information containing the customer code identified in step S620 from the table T2.

FIG. 8 shows an example of relations between users (users trying to view device information) that input login information in step S600, and combinations of information extracted in step S630.

In FIG. 8, user UA is a user that has completed a user registration and belongs to company A, and user UB is a user that has completed a user registration and belongs to company B. FIG. 8 shows combinations of information extracted from table T2 in step S630 of the viewing control process (FIG. 6) after there was a change of manager as described in example 1 or example 2 for a particular device 30 (of serial number *abc) as described with reference to FIG. 7**A.

The Valid and Invalid notations in FIG. 8 indicate whether the combination of extracted information is not an invalid combination of information (is a combination of valid information), or is an invalid combination of information.

For example, if user UA inputs his login information (step S600), and login is successful (step S610 returns Yes), the customer code cc1 corresponding to the user ID of user UA is identified (step S620). As a result, in step S630, as shown in FIG. 8, the combinations of information containing customer code cc1 (serial number, manager code, customer code (and company name)) are extracted. The controller (viewing controller 16) then displays the device information corresponding to the serial number contained in the extracted combinations of information (device information stored in storage 13) in the device information screen (step S630).

When displaying the device information corresponding to the serial number contained in the extracted combinations of information on the device information screen, the controller 11 (viewing controller 16) displays the device information selected according to rules 1 and 2 described below.

Rule 1: Select from the extracted combinations of information device information corresponding to combinations of valid information.

Rule 2: Select from the extracted combinations of information device information corresponding to invalid combinations of information (expired device information).

Device information corresponding to combinations of valid information is device information stored in the storage 13 relationally to the serial numbers contained in combinations of valid information, and is device information that is not expired device information.

Therefore, when user UA inputs his login information (step S600), in step S630 using the example in FIG. 8, the device information stored in the storage 13 relationally to serial numbers *abc, *def, *ghi in combinations of valid information (however, device information that is not expired device information) is selected according to rule 1. In addition, the expired device information stored in the storage 13 corresponding to serial number *abc in the invalid combination of information is selected according to rule 2. The selected device information is then displayed in the device information screen.

FIG. 9 shows a different example than FIG. 8 of relations between users (users trying to view device information) that input login information in step S600, and combinations of information extracted in step S630. FIG. 9 is read the same way as FIG. 8.

FIG. 9 shows combinations of information extracted from table T2 in step S630 of the viewing control process (FIG. 6) after there was a change of manager as described in example 3 for a particular device 30 (of serial number *abc) as described with reference to FIG. 7**B.

If user UA inputs his login information (step S600), and login is successful (step S610 returns Yes), the customer code cc1 corresponding to the user ID of user UA is identified (step S620), and in step S630 multiple combinations of information with the customer code cc1 are extracted as shown in FIG. 9.

More specifically, when user UA inputs his login information (step S600), in step S630 using the example in FIG. 9, the device information stored in the storage 13 relationally to serial numbers *def and *ghi in combinations of valid information (however, device information that is not expired device information) is selected according to rule 1. In addition, the expired device information stored in the storage 13 corresponding to serial number ***abc in the invalid combination of information is selected according to rule 2. The selected device information is then displayed in the device information screen.

When user UB inputs his login information (step S600), and login is successful (step S610 returns Yes), the customer code cc2 corresponding to the user ID of user UB is identified (step S620), and in step S630 multiple combinations of information with the customer code cc2 are extracted as shown in FIG. 9.

More specifically, when user UB inputs his login information (step S600), in step S630 using the example in FIG. 9, the device information stored in the storage 13 relationally to serial numbers *jkl, *mno, ***abc in combinations of valid information (however, device information that is not expired device information) is selected according to rule 1, and the selected device information is then displayed in the device information screen.

The effect of this viewing control process is described below.

User UA can view device information for devices 30 belonging to the organization (such as company A) to which the user belongs, and is device information for the devices 30 during the time the devices 30 were owned by that organization. In this case, if there is a change of manager of the device 30 in that organization, the user UA can view both device information for the period before the manager of the device 30 changed (expired device information), and device information for the period after the device 30 manager changed (device information that is not expired device information).

Even after a device 30 belonging to the same organization as the user (such as company A) is transferred to another organization (such as company B), user UA can view device information for the device 30 from the period during which the device 30 belonged to the organization before being transferred (expired device information). However, user UA cannot view device information for the device 30 in the period after the device 30 is transferred (while the device 30 belongs to organization B).

When the organization (such as company B) to which user UB belongs acquires a device 30 from a different organization (such as company A), user UB can view device information for the device 30 from the period after the device 30 was acquired (bought). However, user UB cannot view device information for the device 30 for the period before the device 30 was acquired (while the device 30 belonged to organization A).

8. Summary

A server 10 (controller 11) according to the embodiment described above has an identification information manager 14 (13) that acquires the serial number, manager code, and customer code of a device 30 through a network 60 from a manager function (application AP2) that manages one or more devices 30, and relationally stores the acquired serial number, manager code, and customer code; a device information collector 15 (13) that collects device information, which is operating information, for each device 30 through the network 60 from the application AP2; and a viewing controller 16 that identifies a customer code according to an operation from an external device (user input of login information), and enables viewing, through the external device, device information of the device 30 identified by the serial number related to the identified customer code.

In other words, the server 10 can allow the customer of a device 30 (a user associated with the customer organization) to view device information for the devices 30 identified by the serial numbers related to the customer code. The server 10 acquires and relationally stores identification information such as serial number, manager code, and customer code, from the application AP2. As a result, necessary information can be acquired more accurately than when the user manually inputs through a user interface and sends to the server 10 the serial number of the device 30 to manage for device information collection and viewing. Furthermore, by acquiring the relationship between the serial number of each device 30 and the manager code of the application AP2 managing the device 30, the server 10 can identify changes in the status of individual devices 30, such as a device being sold or a change in the device manager, and thereby appropriately manage the devices 30 (assist the viewing control process).

In this embodiment of the invention, the server 10 (controller 11) has a customer identification information generator 17 that issues a customer code for each customer. The application AP2 receives the customer code setting issued by the customer identification information generator 17, and sends the set customer code with the serial number of the device 30 to manage and its own manager code to the server 10. In this event, the identification information manager 14 may acquire a customer code common to multiple applications AP2. For example, as shown in FIG. 5B, the identification information manager 14 receives and stores customer code cc1 sent from the application AP2 of manager code apc1 in the table T2, and receives and stores customer code cc1 sent from the application AP2 of manager code apc2 in the table T2. In other words, the server 10 may use a common customer code to manage multiple devices 30 managed by multiple manager functions (applications AP2). More specifically, multiple devices 30 belonging to one customer are related to and managed by the customer code assigned to the customer. By setting the customer code on the device management terminal 20 (application AP2), the user can easily relate the customer code to each device 30 managed by the device management terminal 20 (application AP2).

Furthermore, in the embodiment described above the identification information manager 14 stores user IDs and the relations (table T1, table T2) between the user IDs and customer codes, and in the viewing control process, the viewing controller 16 identifies the customer code based on the user ID identified by a user operation (input of login information) and the relationship between user ID and customer code. This configuration enables a user associated with a customer (such as a company) to view device information for devices 30 the user's company owns through the user's user ID in response to inputting login information.

In this embodiment of the invention, when the identification information manager 14 acquires a combination (second combination) of a serial number and new manager code that differs from the manager code of a combination (first combination) of serial number and manager code already stored in the storage 13 (step S210 returns Yes), and relationally stores to the second combination a second customer code (for example, cc2) that is different from the first customer code (for example, cc1) relationally stored to the first combination (step S440), the viewing controller 16 removes (step S630), when the second customer code corresponding to input of the login information (step S600) was identified (step S620), from the viewable objects device information (expired device information) of the device 30 identified by the serial number in the first combinations the device information collector 15 collected until the second combination is acquired (step S200).

In other words, when the manager code related to a particular serial number is changed (the manager is changed) and a second customer code (new customer) that differs from the previous first customer code (original customer) is then linked to that serial number, the server 10 prevents the new customer from viewing the device information (expired device information) collected from the device 30 of that serial number before the manager changed. As a result, when a device is resold, device information related to the owner of the device before the device was sold can be prevented from being leaked to (accessed by) the new owner.

In this embodiment of the invention, when the identification information manager 14 acquires a second combination with a manager code that differs from the manager code of a first combination (step S210 returns Yes), and relationally stores to the second combination a second customer code (for example, cc2) that is different from the first customer code (for example, cc1) relationally stored to the first combination (step S440), the viewing controller 16 removes (step S630), when the first customer code corresponding to input of the login information (step S600) was identified (step S620), from the viewable objects device information of the device 30 identified by the serial number in the second combination the device information collector 15 collected after the second combination was acquired (step S200).

In other words, when the manager code related to a particular serial number is changed (the manager is changed)

and a second customer code (new customer) that differs from the previous first customer code (original customer) is then linked to that serial number, the server 10 prevents the original customer from viewing the device information collected from the device 30 of that serial number after the customer code changed. As a result, when a device is resold, device information related to the new owner of the device is prevented from being leaked to (accessed by) the old owner.

In this embodiment of the invention, when the identification information manager 14 acquires a second combination with a different manager code than a first combination (step S210 returns Yes), and the first customer code (for example, cc1) relationally stored to the first combination was relationally stored to the second combination (step S440), the viewing controller 16 selects the device information (expired device information) of devices 30 identified by the serial number in first combinations the device information collector 15 collected until the second combination is acquired (step S200), and the device information of devices 30 identified by the serial number in the second combination the device information collector 15 collected after the second combination is acquired (step S200), as the objects to view when the first customer code is identified (step S620) in response to input of the login information (step S600).

In other words, when the manager code related to a particular serial number is changed (the manager is changed) and the first customer code (original customer) is linked to that serial number, the server 10 enables the original customer to view the device information collected from the device 30 of that serial number before the manager code changed (expired device information) and the device information collected after the change. As a result, when the manager of a device is changed to a different manager in the same company (customer), that is, when there is a change in the relationship between device and manager function that is not related to a resale, for example, the same customer can continue viewing device information from both before and after the change of manager.

In this embodiment of the invention, the server 10 does not store user information including login information required for a user to log in to a server 10 (authenticate), and instead is stored on an authentication server 40, which is a shared platform used for user authentication when providing services over a network 60. The risk of personal information leaking can therefore be reduced. Furthermore, because the server 10 does not authenticate users, the processing load of the server 10 can be reduced.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No: 2017-157821, filed Aug. 18, 2017, is expressly incorporated by reference herein in its entirety.

What is claimed is:

1. A viewing control server comprising:
    identification information manager configured to acquire, through a network from a manager function that manages a device, device identification information unique to each device, manager identification information unique to each manager function, and customer identification information unique to each customer, and relationally store the acquired device identification information, manager identification information, and customer identification information;
    a device information collector configured to acquire device information, which is operating information of each device, from the manager function through the network; and
    a viewing controller configured to identify the customer identification information according to an operation from an external device, and enable viewing on an external device the device information of a device identified by the device identification information relationally stored to the identified customer identification information,
    wherein:
        when the identification information manager acquires a second combination containing different manager identification information than a previously stored first combination of the device identification information and manager identification information, and relationally stores to the second combination second customer identification information that is different from first customer identification information stored relationally to the first combination, and
        the viewing controller, when the second customer identification information is identified according to the operation, removes from the viewing information the device information of a device identified by device identification information in the first combinations the device information collector collected before acquiring the second combinations.

2. The viewing control server described in claim 1, further comprising:
    a customer identification information generator configured to issue the customer identification information;
    the identification information manager acquiring common customer identification information from multiple manager functions.

3. The viewing control server described in claim 2, wherein:
    the identification information manager stores user identification information unique to each user relationally to the customer identification information; and
    the viewing controller identifies the customer identification information based on the user identification information identified according to the operation, and a relationship between the user identification information and customer identification information.

4. The viewing control server described in claim 1, wherein:
    when the identification information manager acquires a second combination with different manager identification information than the first combination, and relationally stored to the second combination second customer identification information different from first customer identification information relationally stored to the first combination,
    the viewing controller, when the first customer identification information is identified according to the operation, removes from the viewing information the device information of a device identified by the device identification information in the second combination the device information collector collected after acquiring the second combinations.

5. The viewing control server described in claim 1, wherein:
    when the identification information manager acquires the second combination with different manager identification information than the first combination, and relationally stored to the second combination first customer identification information relationally stored to the first combination, the viewing controller, when the first customer identification information is identified according to the operation, selects for viewing the device information of a device identified by device identification information in the first combination the device information collector collected before the second combination was acquired, and the device information of a device identified by device identification information in the second combination the device information collector collected after acquiring the second combination.

6. A viewing control method comprising:

an identification information manager step of acquiring, through a network from a manager function that manages one or more devices, device identification information unique to each device, manager identification information unique to each manager function, and customer identification information unique to each customer, and relationally storing the acquired device identification information, manager identification information, and customer identification information;

a device information collection step of acquiring device information, which is operating information of each device, from the manager function through the network; and a viewing control step of identifying the customer identification information according to an operation from an external device, and enabling viewing on an external device the device information of a device identified by the device identification information relationally stored to the identified customer identification information, wherein:

when the identification information manager acquires a second combination containing different manager identification information than a previously stored first combination of the device identification information and manager identification information, and relationally stores to the second combination second customer identification information that is different from first customer identification information stored relationally to the first combination, and the viewing controller, when the second customer identification information is identified according to the operation, removes from the viewing information the device information of a device identified by device identification information in the first combinations the device information collector collected before acquiring the second combinations.

* * * * *